United States Patent [19]
DeGroot et al.

[11] Patent Number: 6,021,765
[45] Date of Patent: Feb. 8, 2000

[54] LINEAR-EGR FLOW RATE ADAPTION

[75] Inventors: Kenneth P. DeGroot, Macomb Township; Timothy A. Coatesworth, Orion; Michael Bonne, Berkley, all of Mich.

[73] Assignee: Chrysler Corporation, Auburn Hills, Mich.

[21] Appl. No.: 09/143,601

[22] Filed: Aug. 31, 1998

[51] Int. Cl.[7] ............................................. F02M 25/07
[52] U.S. Cl. .................................... 123/568.21; 123/436
[58] Field of Search ................................... 123/435, 436, 123/568.21, 568.2, 568.22, 568.23, 568.24, 568.26, 568.27

[56] References Cited

U.S. PATENT DOCUMENTS

| | | | |
|---|---|---|---|
| 4,142,493 | 3/1979 | Schira et al. | 123/568.21 |
| 4,173,205 | 11/1979 | Toelle | 123/568.22 |
| 4,561,389 | 12/1985 | Matsumoto | 123/435 |
| 5,003,944 | 4/1991 | Moote et al. | 123/299 |
| 5,113,827 | 5/1992 | Vincent | 123/339.11 |
| 5,261,373 | 11/1993 | Ohsuga et al. | 123/568.2 |
| 5,435,285 | 7/1995 | Adams et al. | 123/492 |
| 5,666,932 | 9/1997 | Bauerle et al. | 123/568.21 |
| 5,687,698 | 11/1997 | Mastro et al. | 123/568.26 |
| 5,779,220 | 7/1998 | Nehl et al. | 123/568.26 |

*Primary Examiner*—Willis R. Wolfe
*Attorney, Agent, or Firm*—Mark P. Calcaterra

[57] ABSTRACT

A method of adapting a linear EGR system is provided to adjust flow rates based on engine roughness. Initially, the level of engine combustion roughness is measured and quantified by a known dynamic crankshaft fuel control methodology. In response, the method adjusts the EGR valve desired position higher or lower based on the measured combustion roughness. For example, if the engine is running "smooth", then more EGR is used. If the engine is running "rough", less EGR is used. As the engine approaches a roughness target, the EGR is stabilized.

6 Claims, 1 Drawing Sheet

LINEAR-EGR FLOW RATE ADAPTION

BACKGROUND OF THE INVENTION

1. Technical Field

The present invention generally relates to engine control systems for automotive vehicles and, more particularly, to a method of controlling an EGR system based on engine stability.

2. Discussion

Recent advances in automotive vehicle engine control systems have led to the development of dynamic crankshaft fueling control systems. For instance, commonly assigned U.S. patent application Ser. No. 08/901,859, entitled "Method for Processing Crankshaft Speed Fluctuations for Control Applications" filed Jul. 29, 1997, which is hereby expressly incorporated by reference herein, discloses one such dynamic fueling control system. According to this system, the amount of fuel delivered to the engine is reduced to obtain superior catalyst light off and engine out hydrocarbon reduction. However, as the fuel to air ratio is leaned out, the engine's burn rate is slowed down and engine stability becomes rougher. Such engine roughness is quantified in the art as the coefficient of variants of torque or COV. Thus, with higher levels of EGR, overall drivability of the vehicle becomes harder.

In view of the foregoing, it would be desirable to provide a system for use in conjunction with a dynamic crankshaft fuel control system to reduce COV and engine roughness.

SUMMARY OF THE INVENTION

The above and other objects are provided by a method of adapting a linear EGR system's flow rate based on COV. Initially, the level of engine combustion roughness is measured and quantified into a COV value by a known dynamic crankshaft fuel control (DCFC) methodology. The method then adjusts the EGR valve desired position higher or lower based on the COV value. For example, if the engine is running "smooth", then more EGR is used. If the engine is running "rough", less EGR is used. As the engine approaches a roughness target, the EGR is stabilized.

BRIEF DESCRIPTION OF THE DRAWING

In order to appreciate the manner in which the advantages and objects of the invention are obtained, a more particular description of the invention will be rendered by reference to specific embodiments thereof which are illustrated in the appended drawing. Understanding that this drawing only depicts a preferred embodiment of the present invention and is not therefore to be considered limiting in scope, the invention will be described and explained with additional specificity and detail through the use of the accompanying drawing in which.

DETAILED DESCRIPTION OF THE PREFERRED EMBODIMENTS

Figure 1:
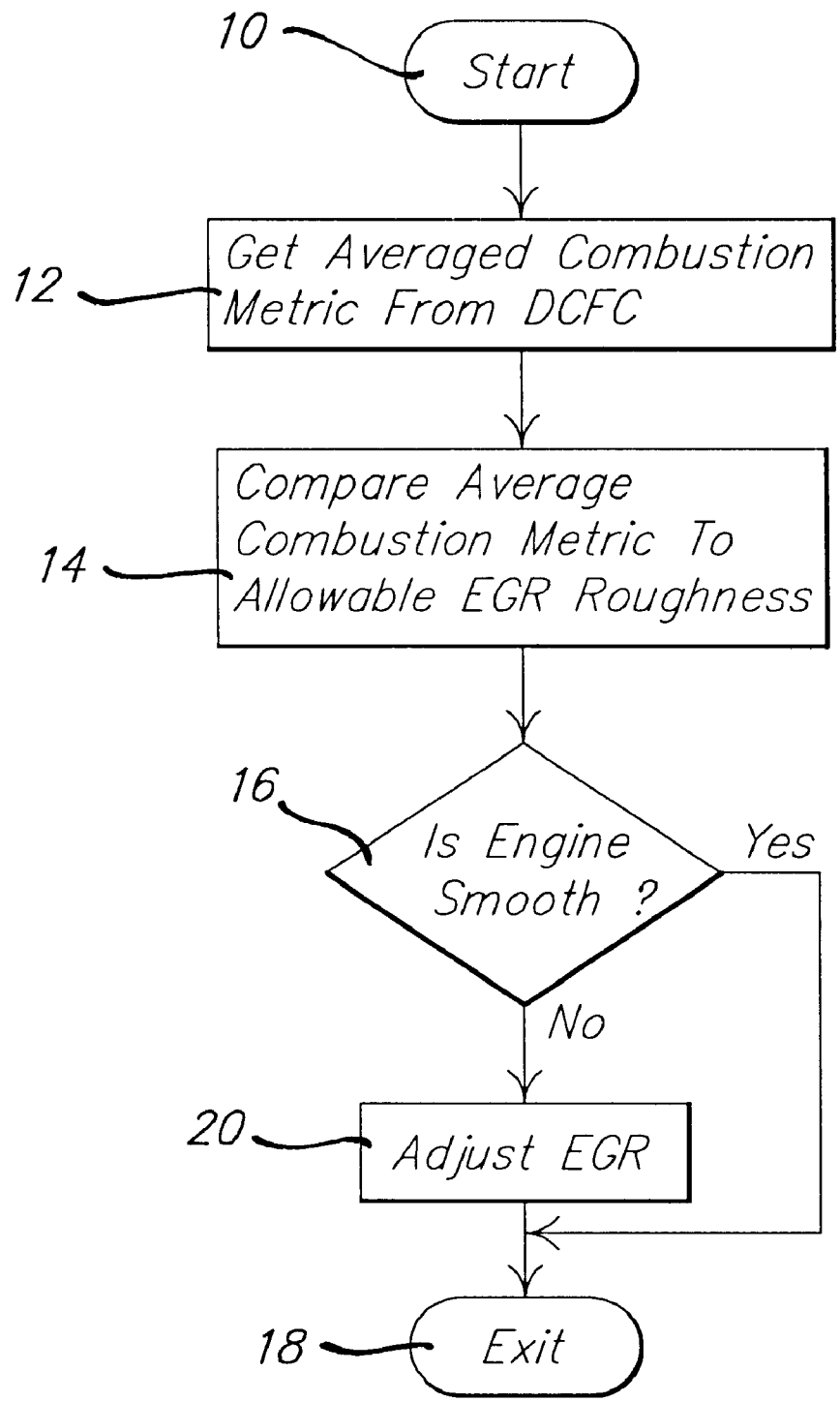
FIG. 1 is a flow chart illustrating the methodology of the EGR control system of the present invention.

The present invention is directed towards reducing engine roughness in a motor vehicle equipped with a dynamic crankshaft fuel control (DCFC) system. More particularly, EGR flow rates are adjusted according to a filtered combustion metric from the DCFC system corresponding to COV. As such, engine roughness is controlled according to the adjusted flow rates through the EGR.

Turning now to the drawing figures, FIG. 1 illustrates a method of controlling a linear EGR system in a vehicle equipped with a DCFC system. The methodology starts in bubble 10 and falls through to block 12. In block 12 the averaged combustion metric value (which is the quantification of COV) is obtained from the DCFC system. From block 12 the methodology continues to block 14 where the averaged combustion metric is compared to an allowable EGR roughness based on RPM and MAP. Such a three dimensional surface (RPM vs. MAP vs. COV) is preferably stored in a look-up table in a memory location such as the engine control unit. From block 14 the methodology continues to decision block 16.

In decision block 16 the methodology determines if the engine is running in a stable mode. For the purposes of this description, the term "stable" means that the engine is operating at a known target roughness. For example, the engine would be deemed to be running stably if the averaged combustion metric from the DCFC system was equal to a given threshold roughness value. If so, the methodology advances to bubble 18 and exits the routine pending a subsequent execution thereof. However, if the engine is not running stably at decision block 16 (i.e., the averaged combustion metric is greater than or less than the threshold value), the methodology continues to block 20. In block 20, the methodology adjusts the EGR to obtain the desired engine running smoothness by causing the engine roughness to approach the target roughness. For example, the linear EGR goal voltage may be adjusted to request less EGR if the engine is running rough (e.g., the combustion metric is greater than the roughness target). After a number of executions of the routine, the EGR is eventually set such that the engine is running smooth. Also, if the engine is running too smooth at decision block 16 (e.g., the combustion metric is less than the roughness target), the methodology adjusts the linear EGR goal voltage to request more EGR. As the engine approaches the roughness target, the EGR may thereafter be stabilized.

Thus, the flow rate through the linear EGR system is adjusted based on engine roughness. More particularly, the EGR valve desired position is adjusted higher or lower based on the measured combustion roughness or COV from a DCFC system. As such, EGR flow rates control engine roughness based on DCFC feedback.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A method of improving the drivability of a vehicle equipped with a dynamic crankshaft fuel control system comprising:

obtaining an engine roughness value from said dynamic crankshaft fuel control system;

comparing said value to an allowable EGR roughness;

determining if an engine of said vehicle is running stably; and adjusting an EGR setting of said engine according to said comparison if said engine is not running stably.

2. The method of claim 1 wherein said EGR roughness corresponds to engine RPM and manifold absolute pressure.

3. The method of claim 1 wherein said comparing step is performed using a look-up table.

4. The method of claim 1 wherein said adjusting step further comprises changing an EGR flow rate.

5. The method of claim 1 wherein said adjusting step further comprises changing a linear EGR goal voltage.

6. A method of improving the drivability of a vehicle equipped with a dynamic crankshaft fuel control system through the use of an EGR system comprising:

obtaining an averaged combustion metric from said dynamic crankshaft fuel control system;

comparing said metric to a three-dimensional surface including engine RPM and manifold absolute pressure to determine a roughness value;

determining if an engine of said vehicle is running at a target roughness;

looking up a linear EGR voltage value corresponding to said roughness value if said engine is not running at said target roughness; and setting an EGR flow rate according to said linear EGR voltage value.

* * * * *